United States Patent
Hamre et al.

(10) Patent No.: US 12,540,050 B2
(45) Date of Patent: Feb. 3, 2026

(54) CABLE STORAGE

(71) Applicant: Agder Tunnelservice AS, Kristiansand (NO)

(72) Inventors: Kjell Vidar Hamre, Flekkefjord (NO); Philipp Löschner, Chemnitz (DE); Michael Tümpner, Aue (DE)

(73) Assignee: Terox AS, Flekkefjord (NO)

( * ) Notice: Subject to any disclaimer, the term of this patent is extended or adjusted under 35 U.S.C. 154(b) by 169 days.

(21) Appl. No.: 18/582,909

(22) Filed: Feb. 21, 2024

(65) Prior Publication Data

US 2024/0279024 A1    Aug. 22, 2024

(30) Foreign Application Priority Data

Feb. 21, 2023 (EP) .................................. 23157747

(51) Int. Cl.
*B65H 75/36* (2006.01)
*B65H 57/14* (2006.01)

(52) U.S. Cl.
CPC ........... *B65H 75/368* (2013.01); *B65H 57/14* (2013.01); *B65H 2402/42* (2013.01); *B65H 2701/34* (2013.01)

(58) Field of Classification Search
CPC ............ B65H 2402/42; B65H 2701/34; B65H 57/14; B65H 75/368; B65H 75/425; B65H 75/48; H02G 11/003; H02G 11/02; H02G 3/0493
USPC ......................................... 242/388.9, 388.91
See application file for complete search history.

(56) References Cited

U.S. PATENT DOCUMENTS

| | | | | |
|---|---|---|---|---|
| 2,919,107 | A * | 12/1959 | Halbrook | B66C 23/36 254/326 |
| 4,643,370 | A * | 2/1987 | Pierce | B65H 49/325 242/396.5 |
| 4,852,856 | A * | 8/1989 | Correll | G02B 6/483 254/134.3 R |
| 5,232,205 | A * | 8/1993 | McVaugh | H02G 1/08 254/134.3 R |
| 5,522,584 | A * | 6/1996 | Kononov | H02G 1/04 254/134.3 R |

(Continued)

FOREIGN PATENT DOCUMENTS

| | | |
|---|---|---|
| CN | 209441234 U | 9/2019 |
| CN | 212267246 U | 1/2021 |

(Continued)

*Primary Examiner* — Anna M Momper
*Assistant Examiner* — Ermia E. Melika
(74) *Attorney, Agent, or Firm* — Laurence A. Greenberg; Werner H. Stemer; Ralph E. Locher

(57) ABSTRACT

A cable storage has a stationary first deflection roller system, a second deflection roller system which is linearly movable relative to the first deflection roller system, and an electric cable which is looped around the first deflection roller system and the second deflection roller system. The cable storage has a mast on which the first deflection roller system and the second deflection roller system are arranged, and the cable storage has a base frame and a bolt connection arrangement. The bolt connection arrangement is oriented in a width direction of the base frame and formed on both sides of the mast for a releasable connection between the mast and the base frame. The bolt connection arrangement is formed on a mast foot, on both sides of the mast.

12 Claims, 5 Drawing Sheets

(56) References Cited

U.S. PATENT DOCUMENTS

| | | | | |
|---|---|---|---|---|
| 6,193,218 | B1* | 2/2001 | Philyaw | H02G 1/08 |
| | | | | 254/326 |
| 6,796,742 | B1* | 9/2004 | Roger | F16L 1/19 |
| | | | | 405/166 |
| 10,811,172 | B2* | 10/2020 | Wabnegger | B21F 11/00 |
| 2005/0062030 | A1* | 3/2005 | Wentworth | E21B 19/084 |
| | | | | 254/323 |
| 2005/0189527 | A1* | 9/2005 | Young | H02G 1/04 |
| | | | | 254/134.3 R |
| 2010/0327242 | A1* | 12/2010 | Radle | H02G 1/083 |
| | | | | 254/134.3 R |
| 2017/0203662 | A1 | 7/2017 | Hiebenthal et al. | |
| 2024/0400347 | A1* | 12/2024 | Oliver | E21B 7/02 |

FOREIGN PATENT DOCUMENTS

| | | |
|---|---|---|
| CN | 215398231 U | 1/2022 |
| DE | 102020111247 A1 | 10/2021 |
| DE | 102019112112 B4 | 11/2021 |
| KR | 20150121824 A | 10/2015 |

\* cited by examiner

CABLE STORAGE

CROSS-REFERENCE TO RELATED APPLICATION

This application claims the priority, under 35 U.S.C. § 119, of European Patent Application EP 23157747.9, filed Feb. 21, 2023; the prior application is herewith incorporated by reference in its entirety.

FIELD AND BACKGROUND OF THE INVENTION

The present invention relates to a cable storage having a stationary first deflection roller system, a second deflection roller system which is height-adjustable relative to the first deflection roller system, and an electric cable which is looped around the first deflection roller system and the second deflection roller system. The cable storage has a mast on which the first deflection roller system and the second deflection roller system are arranged. The cable storage has a base frame and bolt connection means which are oriented in a width direction of the base frame and formed on both sides of the mast for a releasable connection between the mast and the base frame.

When a movable working device is supplied with power via an electric cable, the problem exists that the cable length required in each case to bridge the variable distance from a voltage source to the working device varies depending on the location of the working device. It is therefore necessary to provide a specific cable length which is dimensioned in such a way that a maximum distance between the working device and the voltage source can also be bridged. The maximum distance corresponds to the maximum free cable length, which is configured very differently depending on the task, the type of cable used and the working device to be supplied.

For example, many domestic vacuum cleaners are powered by an electric cable which is a few millimeters thick and approximately 5 to 7 meters long, which is stored on a drum from which it is unwound and on which it is wound up again using a retraction mechanism.

The storage of electric cables with large cable cross-sections, i.e. with a diameter of up to several centimeters, is much more complicated, as is the case for the power supply of high-performance machinery such as excavators.

Such thick electric cables can in principle also be stored on a drum, wherein a retraction of the electric cable then requires an additional, motorized drive mechanism. Reliable cable retraction is particularly important for construction-site vehicles, since the electrical cables are exposed to an increased risk of damage in the harsh working environment. In particular, here the electric cable in question must be prevented from dragging on the often rugged ground for a lengthy period of time.

Cable storages are known from the prior art in which the electric cable is alternately looped around two deflection rollers arranged in parallel, in a similar way to a pulley block.

Such a generic cable storage is known, for example, from non-prosecuted German patent application DE 10 2020 111 247 A1. There the cable storage has two perpendicular profile struts, between which at least two deflection rollers, each with horizontal axes of rotation, are arranged. One of the deflection rollers is mounted in a stationary manner and the other deflection roller is height-adjustable relative to the stationary deflection roller. An electric cable accommodated by the cable storage can be easily pulled out of the cable storage by tensile force, wherein the movable deflection roller is moved towards the stationary deflection roller. During relaxation, the movable deflection roller drops again following gravity, as a result of which the electric cable is automatically rewound.

A storage device for a motor-vehicle charging cable is known from non-prosecuted German patent application DE 10 2019 112 112 A1, which also has a cable storage of the generic type.

U.S. patent publication No. 2017/203662 A1 relates to a cable storage which has a first upper deflection roller and a second lower height-adjustable deflection roller. The deflection rollers are attached to a mast-like support frame, wherein an electric cable is guided over the deflection rollers. The support frame is mounted on a stationary base frame, wherein the support frame is fastened to the base frame with a bolt connection means.

The cable storage devices known from non-prosecuted German patent application DE 10 2020 111 247 A1, non-prosecuted German patent application DE 10 2019 112 112 A1 and U.S. patent publication 2017/203662 A1 each represent only stationary solutions for cable storage.

SUMMARY OF THE INVENTION

It is therefore the object of the present invention to provide a cable storage for mobile use, which increases the action radius of a working device connected thereto and allows a gentle feeding of the electric cable to the working device even under harsh environmental conditions.

The object is achieved according to the invention by a cable storage having a stationary first deflection roller system, a second deflection roller system which is height-adjustable relative to the first deflection roller system, and an electric cable which is wound around the first deflection roller system and the second deflection roller system. The cable storage has a mast on which the first deflection roller system and the second deflection roller system are arranged, and the cable storage has a base frame and bolt connection means. The bolt connection means are oriented in a width direction of the base frame and formed on both sides of the mast for a releasable connection between the mast and the base frame. The bolt connecting means are formed on a mast foot on both sides of the mast. The mast foot has mounting plates which are opposite one another in the width direction of the base frame, are aligned in a longitudinal direction of the base frame extending transversely to the width direction, and are transversely connected to one another and stand upright on the base frame. Wherein each of the mounting plates has two bolt receptacles for the passage of a bolt. The bolt receptacles formed in the mounting plates in each case are opposite one another in pairs. To form the bolt connecting means between the mast and the base frame, a long bolt is passed through two of the opposing bolt receptacles of the mounting plates and through the axially aligned bolt feed-throughs of the base frame on both sides of the mast and is fixed by a locking means, so that the bolt connecting means on both sides of the mast are each formed with the aid of a single bolt, or two shorter bolts on both sides of the mast are each passed through only one bolt receptacle of only one mounting plate of the mast and the associated bolt feed-through of the base frame and are each fixed by a locking means so that the bolt connecting means on both sides of the mast are each formed with the aid of two bolts.

The cable storage according to the invention has a stationary first deflection roller system and a second deflection roller system which is linearly movable relative to the first deflection roller system.

In addition, the cable storage has an electric cable which is looped around the first deflection roller system and around the second deflection roller system. In this case, the electric cable is guided alternately around half the circumference of the first deflection roller system and of the second deflection roller system. The electric cable is preferably taken at least three times alternately around half the circumference of the first deflection roller system and of the second deflection roller system.

By pulling on a free end of the electric cable, which is intended to be connected to a working device, the second deflection roller system lifts and moves in the direction of the first, stationary deflection roller system. The electric cable can thus be removed from the cable storage while reducing a distance between the first and the second deflection roller systems. Without a corresponding tension on the free end of the electric cable, the second deflection roller system drops again, as a result of which the distance between the first and the second deflection roller systems increases and the electric cable is retracted. This mechanism creates a purely mechanical automatic retracting mechanism for the electric cable and ensures that the electric cable is always exposed to a slight tension.

According to the invention, the cable storage further comprises a mast on which the first and the second deflection roller systems are arranged. The first deflection roller system is fixedly connected to the mast. Preferably, the first deflection roller system is fastened to a head end of the mast. The second deflection roller system is movable on the mast along a longitudinal direction of the mast relative to the first deflection roller system.

The cable storage according to the invention also has a base frame and bolt connection means which are oriented in a width direction of the base frame and formed on both sides of the mast for a releasable connection between the mast and the base frame.

The base frame forms a movable platform for the mast and is preferably an undercarriage or can be referred to as an undercarriage. The base frame preferably has rollers, wheels, runners and/or chains on which it can be moved over a surface, such as, for example, on a construction site. To move the base frame, it is preferably either pulled by a working device connected to the electric cable, for example an excavator, or the base frame is designed to be self-propelled and has a corresponding drive device.

The mast can be connected to the base frame via the bolt connection means formed on both sides of the mast and extending in the width direction of the base frame in such a way that it stands stably perpendicularly on the base frame. In this case, the width direction of the base frame is understood to mean an orientation of the base frame extending transversely to a longitudinal direction extending from a front side to a rear side of the base frame. If the base frame is an undercarriage with wheels, runners or chains, the width direction extends transversely, preferably at an angle of 90°, to the orientation and/or direction of movement of the wheels, runners or chains. Both the width direction and the longitudinal direction of the base frame extend horizontally, i.e. parallel to a surface, when the base frame is installed in a manner appropriate for its function.

The bolt connection means formed on both sides of the mast and extending in the width direction of the base frame are releasable. If the bolt connection means on one side of the mast is released, the mast can be moved on the base frame such that it can be stowed flat on the base frame in a stable manner. In such a transport position of the mast on the base frame, the cable storage can be easily transported and can be easily reinstalled at another location.

When supplying an electrically driven working device with the cable storage according to the invention, the mast is erected upright on the base frame and connected to the base frame via the bolt connection means. The free end of the electric cable is preferably guided out at a head end of the mast.

The free end of the electric cable is connected to a power outlet of the working device. Preferably, the power outlet is at a lower height than the head end of the mast, so that the electric cable is held upwardly by the mast.

The working device, for example an excavator, can be supplied with power via the electric cable in a region around the mast, wherein a cable length required for bridging the changing distance between the working device and the mast is automatically released by the interaction of the first and the second deflection roller systems. The fact that no more than only the currently required cable length is released and the electric cable is guided to the working device from above means that the electric cable does not touch the ground at any time. This prevents the electric cable from being dragged over the ground and thereby damaged and/or becoming knotted. The cable storage according to the invention thus provides a simple and reliable storage solution for electric cables, with which even very rigid electric cables can be safely handled in a harsh working environment.

Due to the fact that the cable storage according to the invention has the base frame, it is movable itself and can thus be easily displaced within a construction site. This increases the action radius of a working device connected thereto.

With the cable storage according to the invention, the bolt connection means are formed on a mast foot on both sides of the mast.

For this purpose, bolt receptacles of the bolt connection means are preferably formed on both sides of the mast, wherein the base frame has bolt feedthroughs oriented axially with respect to the bolt receptacles. In this case, bolts are guided through the bolt feedthroughs and the bolt receptacles and fixed by locking means. In this embodiment, a bolt connection between the mast and the base frame is preferably effected by a bolt being guided through a bolt feedthrough of the base frame and through a bolt receptacle of the mast oriented axially thereto. The bolt is then secured against slipping and/or falling off by a locking means. The bolt receptacles are formed on both sides of the mast, so that at least one bolt is provided on each side of the mast at the mast foot for fastening it to the base frame. If the mast is connected to the base frame by at least one bolt on only one side, this at least one bolt forms a swivel joint about which the mast can be pivoted relative to the base frame. The mast can thus be safely folded from a vertical position, i.e. its working position, to a horizontal position, such as a transport position, and erected from a horizontal position to a vertical position, wherein it is held by the mast foot. As a result, the mast foot cannot slip and/or pull out when the mast is being folded down or erected.

The mast foot has, in the width direction of the base frame, oppositely situated mounting plates which are oriented in a longitudinal direction of the base frame extending transversely to the width direction, are cross-linked to one another and stand upright on the base frame.

Each of the mounting plates has two bolt receptacles for the passage of a bolt. The bolt receptacles formed in the mounting plates are located opposite one another in pairs. To form the bolt connection means between the mast and the base frame, a long bolt can be passed through two of the oppositely situated bolt receptacles of the mounting plates and through the axially oriented bolt feedthroughs of the base frame on both sides of the mast and then fixed by a locking means. In this case, the bolt connection means are each formed on both sides of the mast by means of a single bolt. Instead of this, two shorter bolts can for example also be used on both sides of the mast, each of which is guided only through a bolt receptacle of only one mounting plate of the mast and the associated bolt feedthrough of the base frame and each fixed by a locking means. In this case, the bolt connection means are formed on both sides of the mast by means of two bolts.

The mounting plates allow the mast to be folded down and/or erected more easily if it is only connected to the base frame on one side of the mast.

The mounting plates are cross-linked to one another to stabilize them and prevent the mounting plates from bending.

It proves to be particularly advantageous if the cable storage has at least one counterweight connected to the second deflection roller system. The additional counterweight ensures a higher restoring force which pulls the second deflection roller system away from the first deflection roller system. The counterweight is preferably either rigidly connected to the second deflection roller system or attached directly thereto or connected to the second deflection roller system via at least one chain or a belt or a cable. If the at least one counterweight is connected to the second deflection roller system via a chain or a belt or a cable, it is only raised when the second deflection roller system has moved up far enough for the chain, belt or chain to be tensioned.

If the cable storage has at least one counterweight connected to the second deflection roller system, a particularly stable arrangement results if the mast is designed in the form of a frame and the at least one counterweight is guided within the frame. As a result, the counterweight is only linearly movable along a longitudinal direction of the mast and cannot swing out of the frame in the case not only of a vertical but also of a horizontal orientation of the mast.

In a further advantageous embodiment, the at least one counterweight has two interconnected weight blocks. Due to the two interconnected weight blocks, the counterweight acts in a plurality of stages: A first one of the two weight blocks depends on the second deflection roller system or is rigidly connected thereto. In the case of a rigid connection, this one weight block with its additional mass increases the restoring force acting on it for each height of the second deflection roller system. If this one weight block is connected to the lower deflection roller system, for example by a chain or a belt or a cable, this only increases the restoring force on the second deflection roller system when the chain or the belt or the cable is tensioned, as has already been explained above. The further the electric cable is pulled out of the cable storage, the greater the weight of the electric cable suspended from the cable storage, the retraction of which requires a greater restoring force. The increase in the restoring force required for this is effected by the second of the two weight blocks, which is only raised from an even greater height of the second deflection roller system. Preferably, the two weight blocks are interconnected by at least one chain or at least one belt or at least one cable. The at least one chain or the at least one belt or the at least one cable only lifts the second of the two weight blocks when the second deflection roller system is raised to such an extent by pulling the electric cable out of the cable storage that the respective chain or the respective belt or cable is tightly tensioned.

It has proven to be particularly advantageous if the mast has oppositely situated guide rails, each extending in a longitudinal direction of the mast, by which the second deflection roller system is guided. The guide rails guarantee a pendulum-free linear guidance of the second deflection roller system even in the case of strong wind or jerky pulling on the electric cable.

In a further particularly advantageous embodiment, the first deflection roller system and the second deflection roller system each have a winding roller with circumferential guide grooves formed parallel to one another, on which in each case there rests a pressure roller with guide grooves formed therein, which are arranged opposite the respective guide grooves. The electric cable is located in the guide grooves of the winding roller, wherein individual loops of the electric cable are each located in their own guide groove. The guide grooves of the pressure rollers assigned to the winding rollers are arranged opposite the respective guide grooves. As a result, the electric cable is guided through the guide grooves on one side and is held in the respective guide grooves by the guide grooves of the pressure roller on a side opposite the guide grooves. The pressure rollers thus prevent the electric cable from slipping out of the guide grooves, which is particularly useful when transporting the cable storage.

For easy assembly and/or disassembly of the cable storage, it is particularly advantageous if the mast has a mast head on which a hook eye is formed. A crane hook, for example, can be hooked into the hook eye in order to lift the mast at its mast head. With a crane hook of a crane or towing vehicle guided through the hook eye, the mast can be easily folded down and/or erected.

For horizontal transport of the mast on the base frame, it is advantageous if the mast has bearing supports projecting on one side. For example, four such bearing supports are provided. When the mast is in a horizontal transport position, it rests on the bearing supports projecting from the mast on one side, so that the electric cable is not clamped between the mast and the base frame.

In a preferred embodiment of the cable storage according to the invention, the base frame has runners connected to one another via cross-struts. The base frame rests with the runners on a surface and can be pulled over the ground by a working device connected to the cable storage, for example using a tow rope or a chain. However, the runners are also very well suited for receiving and securing the base frame on a semitrailer or a truck load bed.

In an advantageous embodiment of the cable storage according to the invention, said cable storage has a cable drum which is arranged separately from the mast on the base frame. An extension cable is wound on the cable drum and can be connected to the electric cable located on the mast of the cable storage and, on the other hand, to a voltage source. By winding and unwinding the extension cable, a free length of the unwound extension cable can be varied in order to thus bridge different distances between the cable storage and the voltage source. For example, the cable storage according to the invention can be moved by the cable drum on a construction site without the extension cable having to be separated from the voltage source for this purpose. At the same time, a length of the extension cable that is not required is safely stowed away on the cable drum and is not dragged over the ground.

In a further particularly advantageous embodiment of the cable storage according to the invention, at least two guide rollers are arranged at a cable outlet of the mast, between which the electric cable is clamped, wherein a cable brake sleeve is attached around an end portion of the electric cable. The two guide rollers at the cable outlet of the mast ensure that the electric cable is always unwound in the same direction from the first deflection roller system, so that the electric cable does not slip on the first deflection roller system. As a result of the guide rollers, it therefore makes no difference for an unwinding of the electric cable from the first deflection roller system whether the electric cable is unwound longitudinally or transversely to the width direction of the base frame. In addition, the guide rollers form a stop for a cable brake sleeve which is formed at an end section of the electric cable. If the cable brake sleeve strikes the guide rollers, the electric cable cannot be pulled any further into the cable storage. As a result, a minimum length of the electric cable always remains outside the mast.

If at least two guide rollers are arranged at a cable outlet of the mast, it proves to be particularly advantageous if the at least two guide rollers are mounted on a mounting frame inclined at an angle to the mast. The inclined mounting frame facilitates an unwinding of the electric cable into a region of movement of a working device, such as an excavator, connected to the electric cable. The region of movement typically extends in a circle around the mast of the cable storage, which can be rotated including the base frame. Due to the mounting frame being inclined at an angle to the mast, the guide rollers are inclined downwards in such a way that the electric cable clamped by the guide rollers can be unwound diagonally downwards in a line, starting from the cable outlet of the mast, into the region of movement of the working device.

Other features which are considered as characteristic for the invention are set forth in the appended claims.

Although the invention is illustrated and described herein as embodied in a cable storage, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
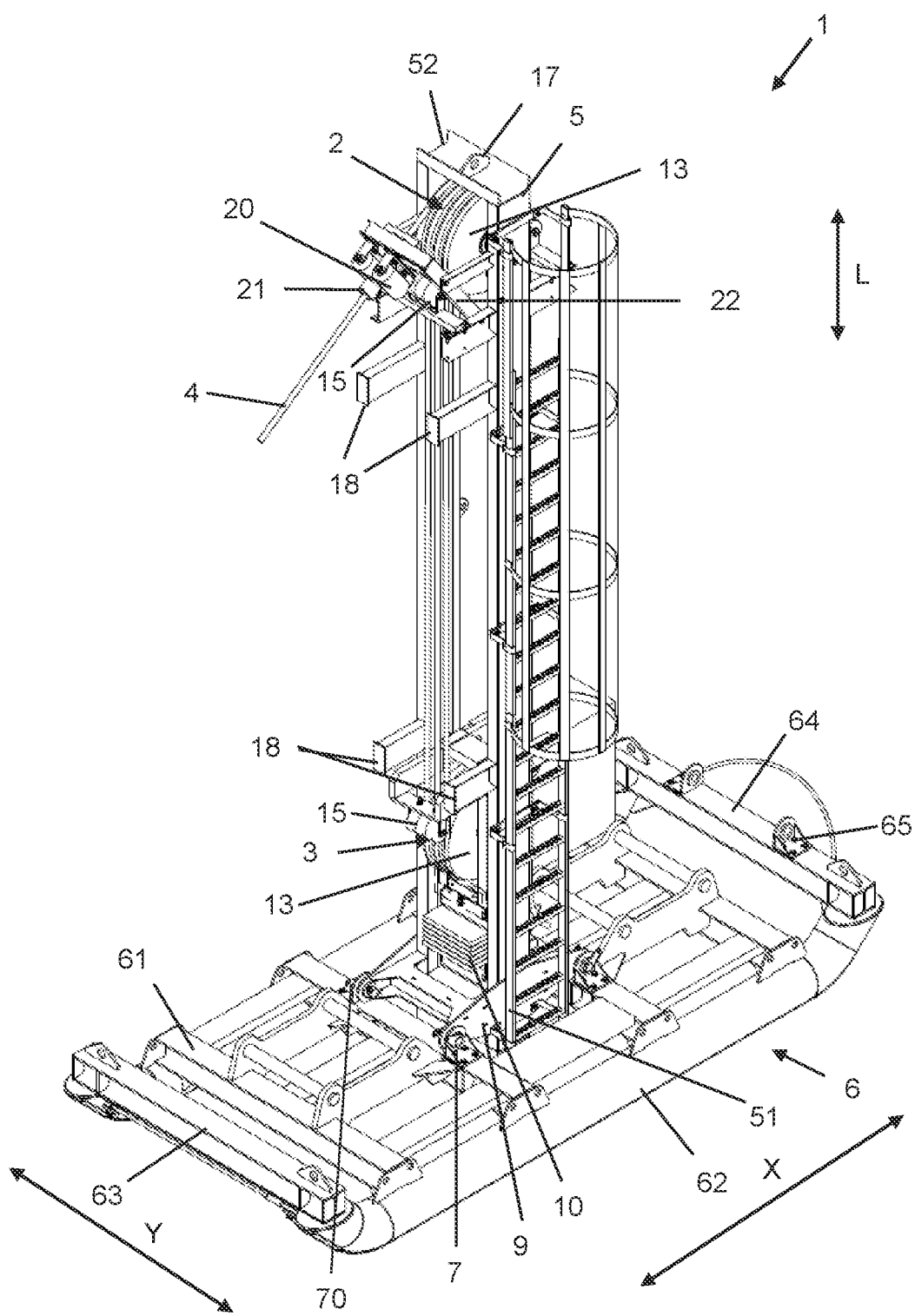
FIG. 1 is a diagrammatic, perspective view showing an embodiment of a cable storage according to the invention with a vertically arranged mast in a perspective side view.
Figure 2:
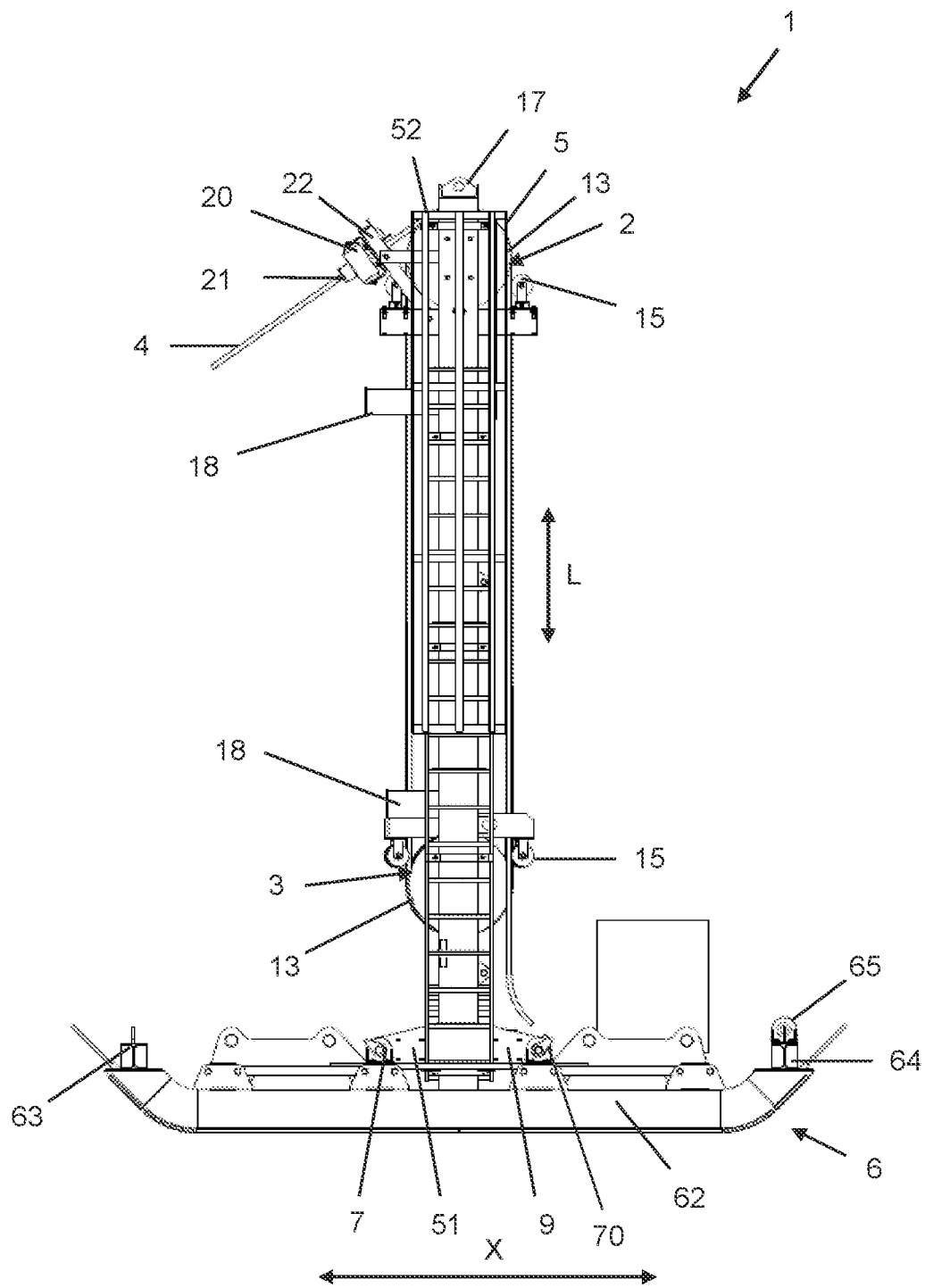
FIG. 2 is a side view showing the cable storage from FIG. 1 with the vertically arranged mast.

Referring now to the figures of the drawings in detail and first, particularly to FIG. 1 thereof, there is shown a cable storage 1 according to the invention in a perspective side view. FIG. 2 shows the same embodiment of the cable storage 1 according to the invention, as shown in FIG. 1, but in a side view.

The cable storage 1 has a stationary first deflection roller system 2 and a second deflection roller system 3. The height of the second deflection roller system 3 is linearly adjustable relative to the first deflection roller system 2.

The cable storage 1 has an electric cable 4, which is alternately wound around half the circumference of the first deflection roller system 2 and of the second deflection roller system 3. In the embodiment shown in FIG. 1, the electric cable 4 is wound a total of three times around the first deflection roller system 2 and the second deflection roller system 3. However, the electric cable 4 could also be wound more or fewer times around the deflection roller systems 2, 3. One end of the electric cable 4 is intended to be connected directly or indirectly to a voltage source. Another end of the electric cable 4 is intended to be connected to an electrically operating working device in order to supply it with electric current.

In the present case, for the sake of improved clarity, the illustration not only of a voltage source but also of a working device has been dispensed with.

The cable storage 1 shown in FIGS. 1 and 2 is particularly suitable for the power supply of high-performance working devices. These include, for example, mobile or semi-mobile construction machines and construction-site vehicles, such as bulldozers, excavators, wheel loaders, crushers, chippers, screening machines or cranes, but also agricultural machines, mining equipment, etc.

The cable storage 1 has a mast 5 and a base frame 6. The base frame 6 has a longitudinal direction X and a width direction Y. The first deflection roller system 2 and the second deflection roller system 3 are arranged on the mast 5.

In the embodiment of the cable storage 1 shown in FIGS. 1 and 2, the mast 5 stands upright on the base frame 6. In this case, it is connected to the base frame 6 by means of bolt connection means 7 formed on both sides of the mast 5 and extending in the width direction Y of the base frame 6. The mast 5 can easily be folded over to one side by releasing the bolt connection means 7 formed on both sides of the mast 5 at least on one side.

In the embodiment of the invention shown in FIGS. 1 and 2, the base frame 6 has runners 62 connected to one another via cross-struts 61. The runners 62 extend in the longitudinal direction X of the base frame 6. The base frame 6 rests with the runners 62 on a surface and can be pulled over the surface by a working device connected to the cable storage 1, for example using a tow rope or a chain. However, the runners 62 are also very well-suited for accommodating and securing the base frame 6 on a semitrailer or a truck load bed. Instead of runners 62, the base frame 6 can also have rollers, wheels and/or chains. The base frame 6 forms a movable undercarriage, i.e. a movable platform for the mast 5, which is either pulled over the surface or itself has a drive mechanism for locomotion.

In the embodiment of the cable storage 1 shown in FIGS. 1 and 2, the bolt connection means 7 are configured in such a way that bolt receptacles are formed on a mast foot 51, on both sides of the mast 5, and the base frame 6 has bolt feedthroughs oriented axially with respect to the bolt receptacles. Bolts are guided through the bolt feedthroughs and the bolt receptacles and are fixed by locking means 70. This forms a reliable and at the same time easily releasable connection of the mast 5 to the base frame 6.

In the embodiment of the cable storage 1 shown, the mast foot has, in the width direction Y of the base frame 6, oppositely situated mounting plates 9 which are oriented in the longitudinal direction X of the base frame 6 and stand upright on the base frame 6, in which mounting plates the bolt receptacles are formed. In the embodiment shown, each of the mounting plates 9 has two bolt receptacles for the passage of a bolt. The bolt receptacles formed in the mounting plates 9 are located opposite one another in pairs. In order to form a bolt connection between the mast 5 and the base frame 6, in the embodiment shown, a total of four bolts, which are arranged on both sides of the mast 5 and opposite one another, are each guided through one of the bolt receptacles of one of the mounting plates 9 and the bolt feedthrough of the base frame 6 which is oriented axially thereto. The bolts are each secured against slipping and/or falling off by a locking means 70.

Alternatively, a long bolt can be guided on both sides of the mast 5 through two oppositely located bolt receptacles formed in the mounting plates 9 and the bolt feedthroughs of the base frame 6, which are oriented axially thereto, and can then be fixed by a locking means 70. In this case, the bolt connection means 7 are each formed on both sides of the mast 5 by means of only one bolt.

If the mast 5 is connected to the base frame 6 only on one side by a corresponding bolt connection, i.e. if the bolt connection on the other side of the mast 5 is released, the bolt connection that is not released forms a swivel joint about which the mast 5 can be pivoted relative to the base frame 6. The mast 5 can be safely folded from a vertical position to a horizontal position and erected from a horizontal position to a vertical position, wherein it is held by the mast foot 51.

The upright mounting plates 9 determine the direction in which the mast 5 can be folded and hold said mast laterally.

In the embodiment of the cable storage 1 shown in FIGS. 1 and 2, the mounting plates 9 are connected to one another via support profiles and are stabilized thereby.

In the embodiment of the cable storage 1 shown in FIGS. 1 and 2, the first deflection roller system 2 and the second deflection roller system 3 each have a winding roller 13 against which two pressure rollers 15 rest.

Figure 6:
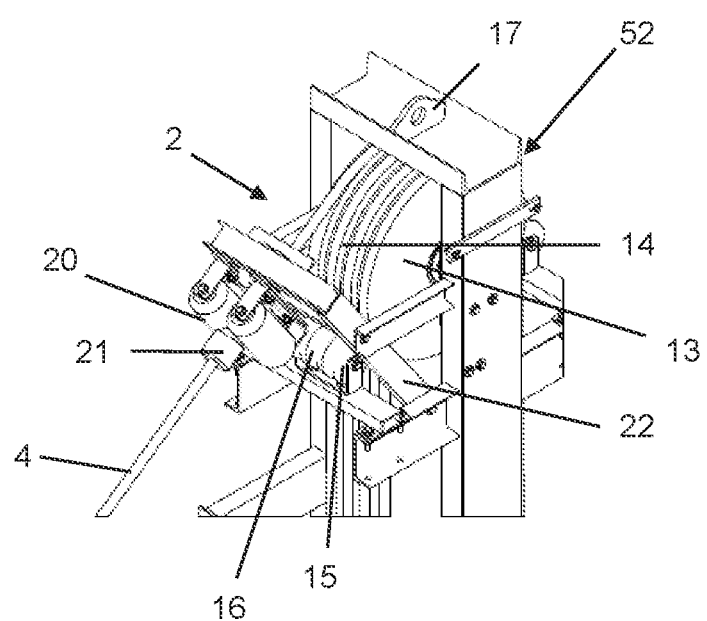
FIG. 6 is a perspective view showing the mast head of the cable storage from FIG. 1.

As can be seen in FIG. 6, the winding rollers 13 have circumferential guide grooves 14 which are formed parallel to one another and the pressure rollers 15 have guide grooves 16 formed therein, which guide grooves 16 are arranged opposite the respective guide grooves 14. The electric cable 4 is located in the guide grooves 14 of the winding roller 13, so that individual loops of the electric cable 4 are each located in their own guide groove 14. In addition, the electric cable 4 is held in the respective guide grooves 14 by the guide grooves 16 of the pressure roller 15 from a side opposite the guide grooves 14. As a result, the pressure rollers 15 prevent the electric cable 4 from slipping out of the guide grooves 14 even if the electric cable 4 is pulled jerkily or the mast 5 is transported lying flat.

In the embodiment of the cable storage 1 shown in FIGS. 1 and 2, its mast 5 has a mast head 52 on which a hook eye 17 is formed. A crane hook, for example, can be attached to the hook eye 17 in order to raise and/or lower the mast 5.

In the embodiment of the cable storage 1 shown in FIGS. 1 and 2, its mast 5 has bearing supports 18 projecting on one side, on which the mast 5 can be placed on the base frame 6 in a horizontal position, i.e. lying flat. In the embodiment shown, the mast 5 has an upper pair of bearing supports 18 and a lower pair of bearing supports 18, which can each be placed on a support strut 63 running transversely to the base frame 6.

Figure 3:
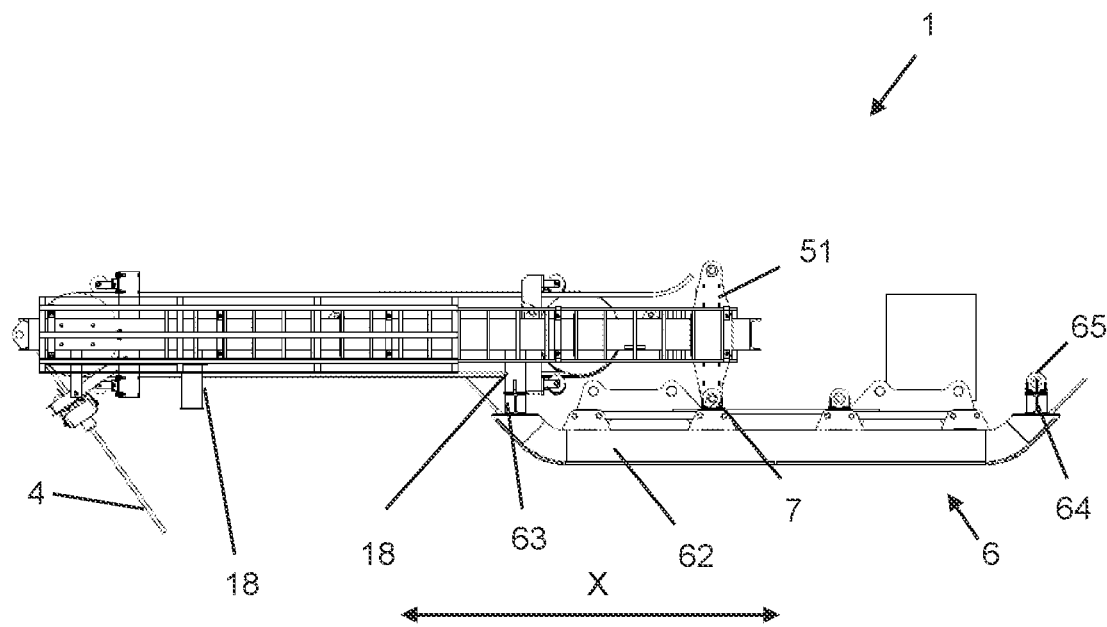
FIG. 3 is a side view showing the cable storage from FIG. 1 with a folded mast.
Figure 4:
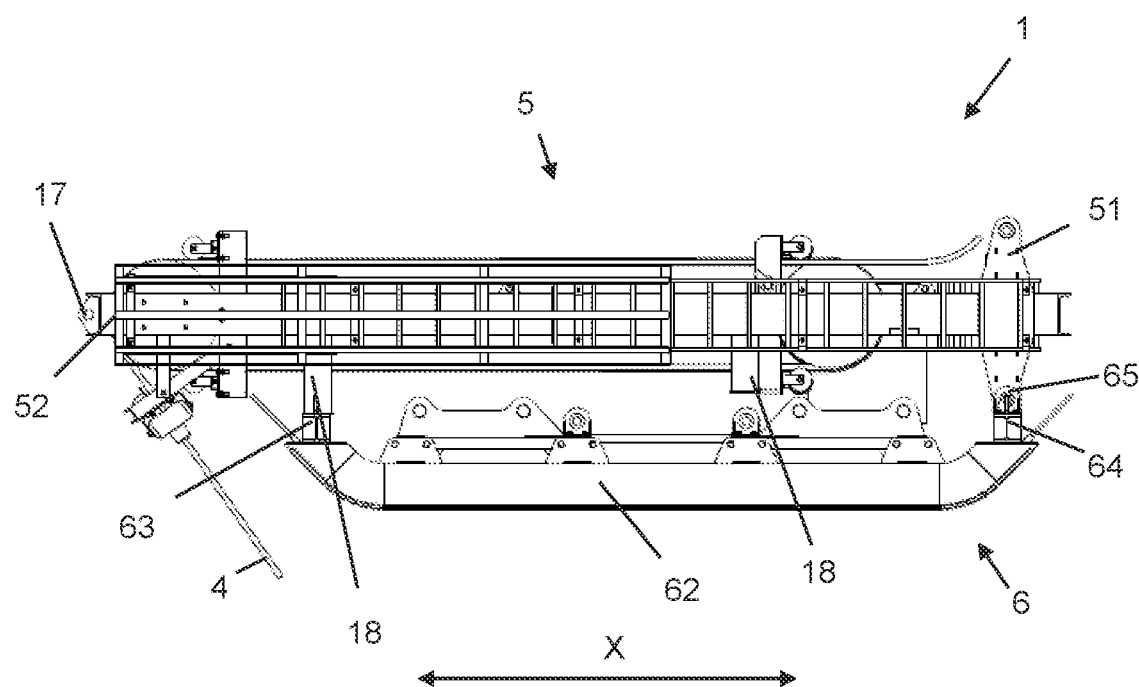
FIG. 4 is a side view showing the cable storage from FIG. 1 with a mast folded for transport.

FIGS. 3 and 4 each show a side view of the cable storage 1 from FIGS. 1 and 2, each with the mast 5 lying flat. Here the mast 5 lies in the longitudinal direction X on the base frame 6.

FIG. 3 shows how the mast 5 is connected to the base frame 6 only on one side with bolt connection means 7. The one-sided bolt connection means 7 form a swivel joint about which the mast 5 can be pivoted. This allows the mast 5 to be folded from a vertical position to a horizontal position and vice versa. In the horizontal position of the mast 5, the lower pair of bearing supports 18 rests on the support strut 63 of the base frame 6. In this case, the mast foot 51 is connected to the base frame 6 on a side of the mast 5 facing the base frame 6 by the bolt connection means 7 and is thus secured against slipping and/or pulling out.

FIG. 4 shows the embodiment of the cable storage 1 shown there in a transport position. The mast 5 rests with the upper pair of bearing supports 18 on the support strut 63 of the base frame 6. The mast foot 51 rests on a support strut 64 extending transversely to the base frame 6. As is shown in FIGS. 3 and 4, the support struts 63 and 64 are preferably each arranged at opposite longitudinal ends of the base frame 6. To secure the mast 5 during transport, angular securing structures 65 are arranged on the support strut 64, through which securing bolts can be passed to fasten the mast foot 51. In the embodiment of the cable storage 1 shown, the angular securing structures 65 are designed and arranged on the support strut 64 in such a way that the bolts, which are also used to form the bolt connection means 7 between the mast 5 and the base frame 6, can also be used as securing bolts for securing during transport.

FIGS. 5A to 5D show only the mast 5 of the embodiment of the cable storage 1 shown in FIG. 1.

Figures 5A, 5B, 5C, 5D:
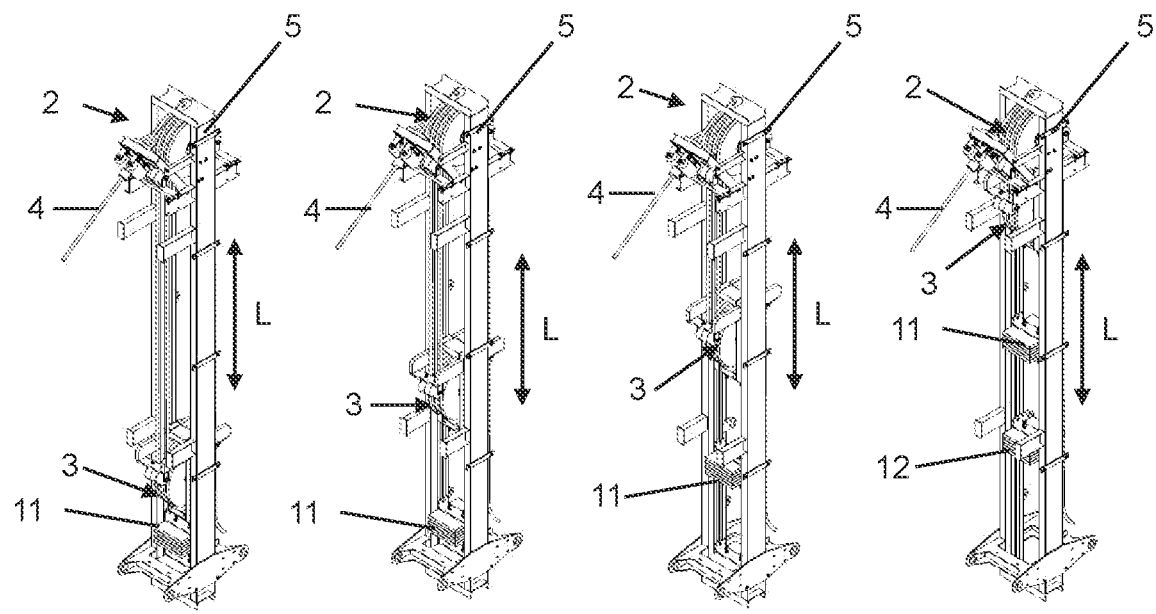
FIGS. 5A to 5D are side, perspective views showing only the mast from FIG. 1 with different distances between a first and a second deflection roller system, in each case.

As can be seen in FIGS. 5A to 5D, the cable storage 1 has a counterweight 10 connected to the second deflection roller system 3. The counterweight 10 ensures a higher restoring force which pulls the second deflection roller system 3 away from the first deflection roller system 2. In the embodiment of the cable storage 1 shown, the counterweight 10 has two weight blocks 11, 12. A first of the two weight blocks 11 is connected to the second deflection roller system 3 by two chains. As can be seen in FIG. 5C, this weight block 11 is only raised when the second deflection roller system 3 has moved far enough upwards to tension the two chains tightly.

A second of the two weight blocks 12 is connected to the other weight block 11 by two chains and is only raised when the lower deflection roller system 3, as can be seen in FIG. 5D, is moved further upwards. By means of the two weight blocks 11, 12 connected to one another by means of chains, the restoring force acting on the second deflection roller system 3 is increased in several stages in order to be able to compensate for an increasing tensile force of an electric cable 4 which is guided out further and further from the mast 5.

In the embodiment shown, the mast 5 is configured as a frame in which the at least one counterweight 10 is guided. As a result, the counterweight 10 is only linearly movable along a longitudinal direction L of the mast 5 and cannot swing out of the frame in the case not only of a vertical but also of a horizontal orientation of the mast 5.

In the embodiment shown in FIGS. 5A to 5D, the mast 5 has oppositely located guide rails, each extending in a longitudinal direction L of the mast 5, by which the second deflection roller system 3 is guided. The guide rails guarantee a pendulum-free linear guidance of the second deflection roller system 3 even in the case of strong wind and jerky pulling on the electric cable 4.

FIG. 6 shows an enlarged illustration of the mast head 52 of the embodiment of the cable storage 1 shown in FIG. 1.

As can be seen clearly in FIG. 6, in the embodiment shown, two guide rollers 20 are arranged at a cable outlet of the mast 5, between which guide rollers the electric cable 4 is clamped. In addition, a cable brake sleeve 21 is attached around an end portion of the electric cable 4. The two guide rollers 20 at the cable outlet of the mast 5 ensure that the electric cable 4 is always unwound in the same direction from the first deflection roller system 2, regardless of whether the electric cable 4 is unwound in the longitudinal direction X of the base frame 6 or in the width direction Y of the base frame 6. In addition, the guide rollers 20 form a stop for the cable brake sleeve 21 which is formed at an end portion of the electric cable 4. When the cable brake sleeve 21 strikes the guide rollers 20, a minimum length of the electric cable 4 always remains outside the mast 5.

Instead of clamping the electric cable 4 between two guide rollers 20, it can also be guided through an eyelet arranged at the cable outlet of the mast 5.

The two guide rollers 20 are mounted on a mounting frame 22 inclined at an angle to the mast 5. The inclined mounting frame 22 facilitates an unwinding of the electric cable 4 into a region of movement of a working device connected to the electric cable 4, which typically extends like a circle around the mast 5 of the cable storage 1.

Figure 7:
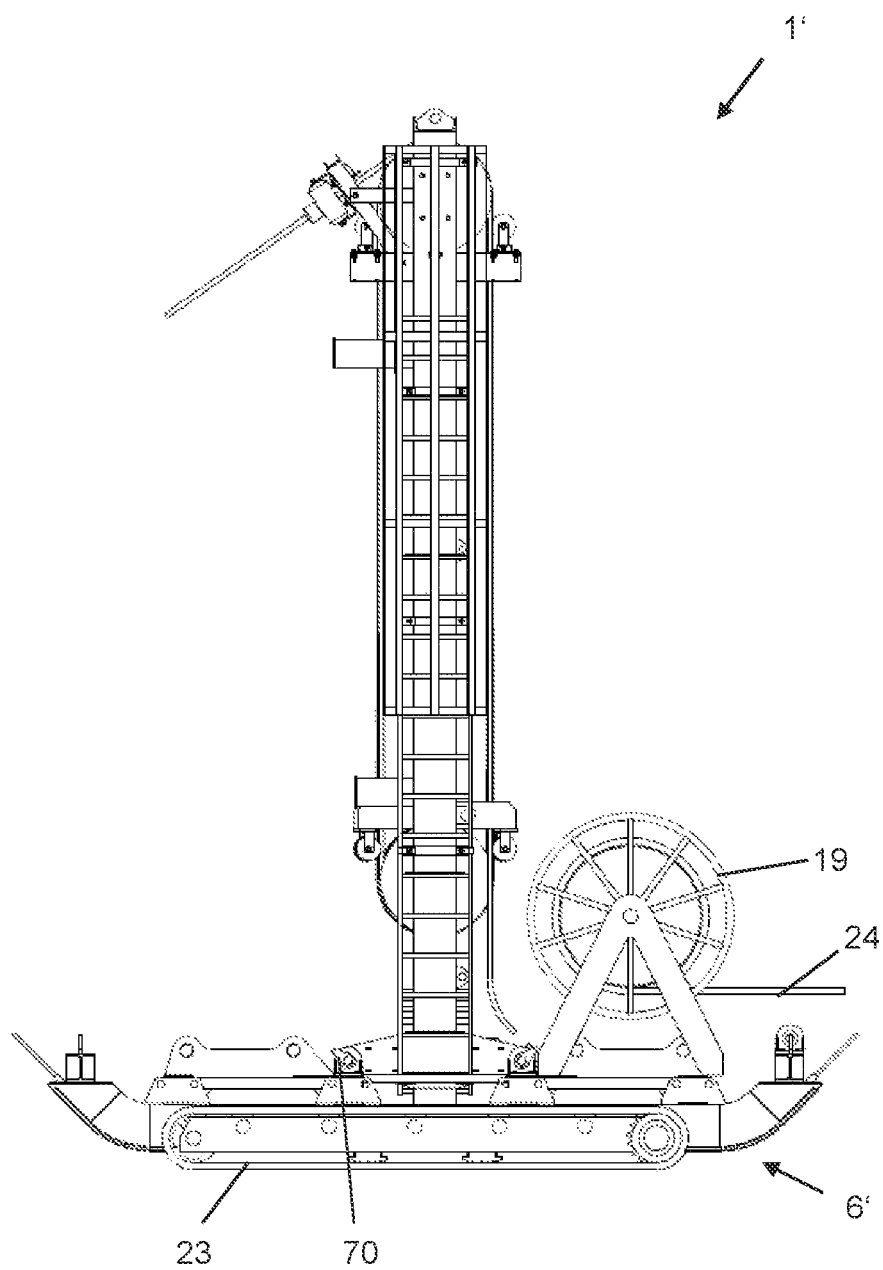
FIG. 7 is a side view showing a further embodiment of the cable storage according to the invention.

FIG. 7 shows a second embodiment of the cable storage 1' according to the invention, the structure of which corresponds to the embodiment of the cable storage 1 shown in FIG. 1 except for the base frame 6' and an additional cable drum 19.

For this reason, only the differences between the two embodiments of the cable storage 1, 1' according to the invention are described below.

In the embodiment of the cable storage 1' shown in FIG. 7, it additionally comprises the cable drum 19. The cable drum 19 is arranged separately from the mast 5 on the base frame 6'. An extension cable 24 is wound on the cable drum 19 in order to be able to bridge greater distances between the cable storage 1' and a voltage source. This allows the cable storage 1' to be moved without having to interrupt a power supply to a working device connected to the cable storage 1'.

In the embodiment of the cable storage 1' shown in FIG. 7, the base frame 6' additionally has chains 23 and is designed to be self-propelled by an additional motor and chain drive. The cable storage 1' shown in FIG. 7 can be moved around a construction site without a towing vehicle and can be used there at different locations for the power supply of construction-site vehicles and working devices.

The invention claimed is:

1. A cable storage, comprising:
   a stationary first deflection roller system;
   a second deflection roller system being height-adjustable relative to said stationary first deflection roller system;
   an electric cable looping around said stationary first deflection roller system and said second deflection roller system;
   a mast on which said stationary first deflection roller system and said second deflection roller system are disposed;
   a base frame having axially aligned bolt feedthroughs;
   bolt connection means oriented in a width direction of said base frame and formed on both sides of said mast for a releasable connection between said mast and said base frame;
   a mast foot, said bolt connection means being formed on said mast foot, on both sides of said mast, said mast foot having mounting plates being opposite one another in the width direction of said base frame, are aligned with in a longitudinal direction of said base frame extending transversely to the width direction, are transversely connected to one another and stand upright on said base frame, wherein each of said mounting plates has two bolt receptacles formed therein for a passage of a bolt, said bolt receptacles formed in said mounting plates in each case are opposite one another in pairs, to form said bolt connecting means between said mast and said base frame;
   locking means; and
   a longer bolt is passed through two of said opposing bolt receptacles of said mounting plates and through said axially aligned bolt feedthroughs of said base frame on both sides of said mast and is fixed by said locking means so that said bolt connecting means on both sides of said mast are each formed with an aid of a single bolt, or two shorter bolts on both sides of said mast are each passed through only one of said bolt receptacles of only one of said mounting plates of said mast and an associated one of said axially aligned bolt feedthroughs of said base frame and are each fixed by said locking means so that said bolt connecting means on both sides of said mast are each formed with an aid of two said shorter bolts.

2. The cable storage according to claim 1, further comprising has at least one counterweight connected to said second deflection roller system.

3. The cable storage according to claim 2, wherein said mast is configured in form of a frame and said at least one counterweight is guided within said frame.

4. The cable storage according to claim 2, wherein said at least one counterweight has two interconnected weight blocks.

5. The cable storage according to claim 1, wherein said mast has oppositely situated guide rails, each extending in a longitudinal direction of said mast, by which said second deflection roller system is guided.

6. The cable storage according to claim 1, wherein said stationary first deflection roller system and said second deflection roller system each have a winding roller with circumferential guide grooves formed therein and parallel to one another, on which there rests at least one pressure roller with guide grooves formed therein, which are disposed opposite said circumferential guide grooves.

7. The cable storage according to claim 1, wherein said mast has a mast head on which a hook eye is formed.

8. The cable storage according to claim 1, wherein said mast has bearing supports projecting on one side of said mast.

9. The cable storage according to claim 1, wherein said base frame has runners connected to one another via cross-struts.

10. The cable storage according to claim 1, further comprising a cable drum disposed separately from said mast on said base frame.

11. The cable storage according to claim 1,
wherein said mast has a cable outlet;
further comprising at least two guide rollers disposed at said cable outlet of said mast, between said at least two guide rollers said electric cable is clamped; and
further comprising a cable brake sleeve attached around an end portion of said electric cable.

12. The cable storage according to claim 11, further comprising a mounting frame, said at least two guide rollers are mounted on said mounting frame inclined at an angle to said mast.

\* \* \* \* \*